United States Patent [19]

Scherbatskoy

[11] Patent Number: 4,692,911

[45] Date of Patent: Sep. 8, 1987

[54] METHODS AND APPARATUS FOR REDUCING INTERFERING EFFECTS IN MEASUREMENT WHILE DRILLING OPERATIONS

[76] Inventor: Serge A. Scherbatskoy, 3921 Clayton Rd. E., Fort Worth, Tex. 76116

[21] Appl. No.: 878,425

[22] Filed: Jun. 25, 1986

Related U.S. Application Data

[60] Continuation of Ser. No. 389,469, Jun. 17, 1982, which is a division of Ser. No. 110,848, Jan. 10, 1980, Pat. No. 4,351,037, which is a division of Ser. No. 857,677, Dec. 5, 1977, abandoned.

[51] Int. Cl.$^4$ .............................................. G01V 1/40
[52] U.S. Cl. ......................................... 367/83; 175/40
[58] Field of Search ..................................... 367/81-85, 367/38; 73/152, 153; 175/40, 48; 364/422

[56] References Cited

U.S. PATENT DOCUMENTS

| 3,302,457 | 2/1967 | Mayes | 73/152 |
| 3,488,629 | 1/1970 | Claycomb | 367/83 |
| 3,555,504 | 1/1971 | Fields | 367/83 |
| 3,716,830 | 2/1973 | Garcia | 367/83 |
| 3,742,443 | 6/1973 | Foster et al. | 367/83 |
| 4,262,343 | 4/1981 | Claycomb | 175/48 |

Primary Examiner—Thomas H. Tarcza
Assistant Examiner—Ian J. Lobo
Attorney, Agent, or Firm—Head, Johnson & Stevenson

[57] ABSTRACT

Apparatus and methods of making measurements in a borehole while drilling by using a fluid circulation system having interfering pressure variations including the steps of measuring selected parameters at various depths in the borehole and generating in pressure changes indicative of the values of the measured parameters, producing signals representing a superposition of the generated pressure changes and the interfering pressure variations and utilizing the recurrence of the interfering pressure variations for deriving from the first signals resultant signals representing substantially the information carrying pressure changes.

29 Claims, 14 Drawing Figures

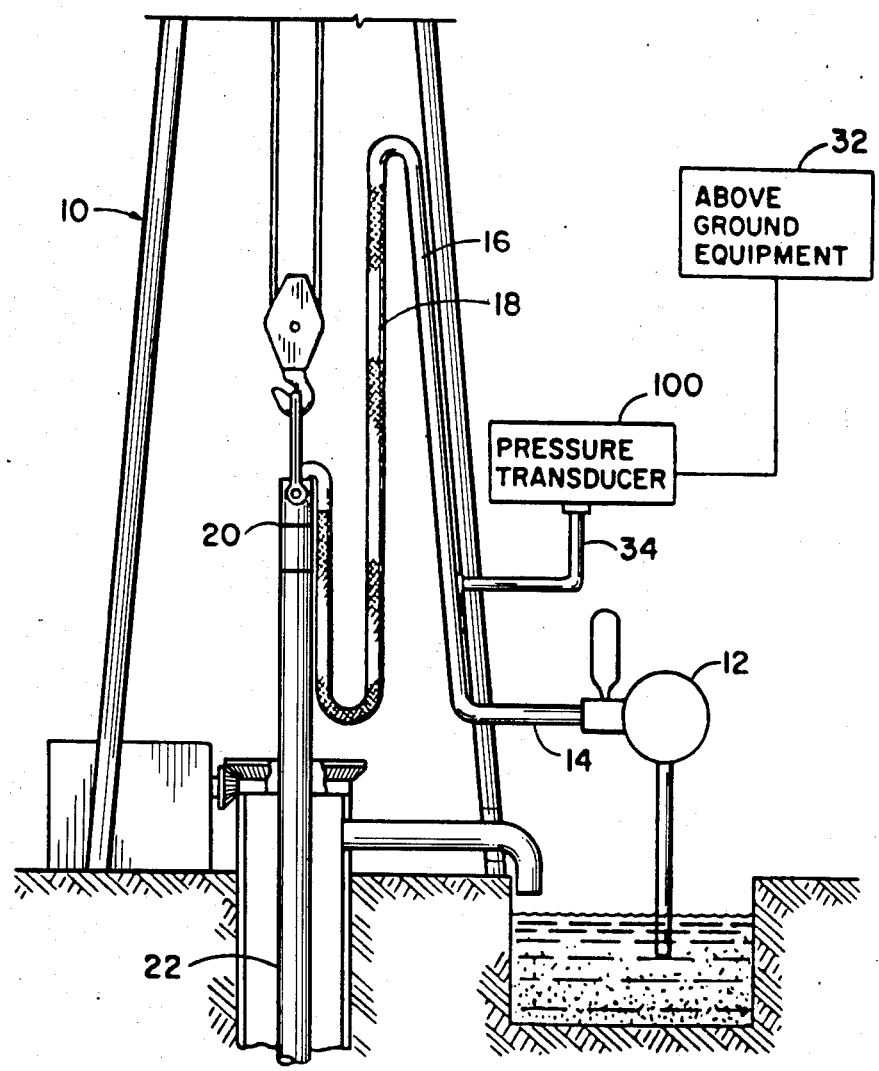
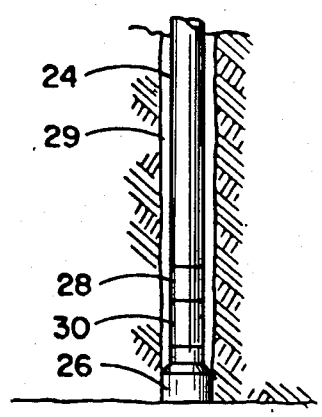
Fig. 1

FIG. 2A
FIG. 2B
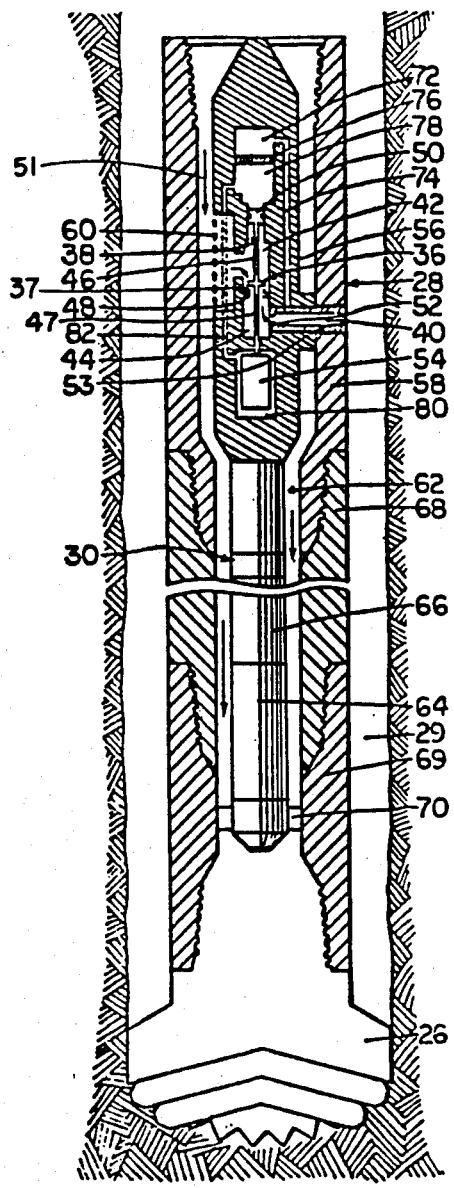
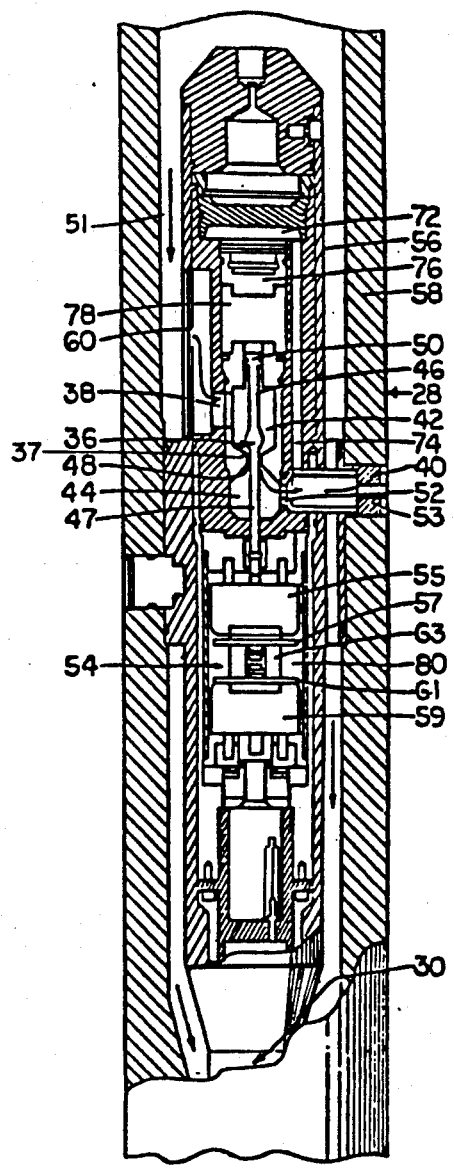

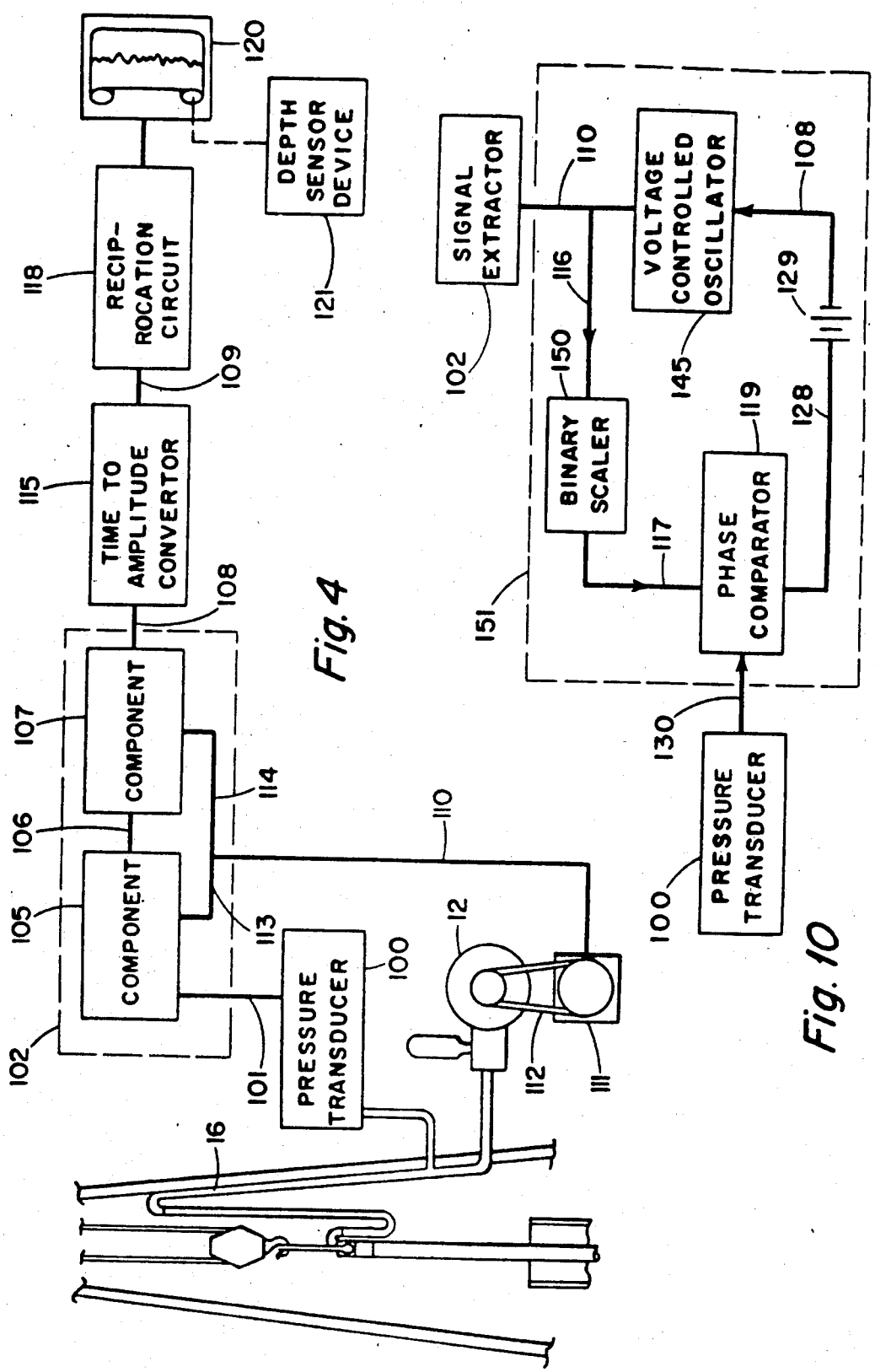

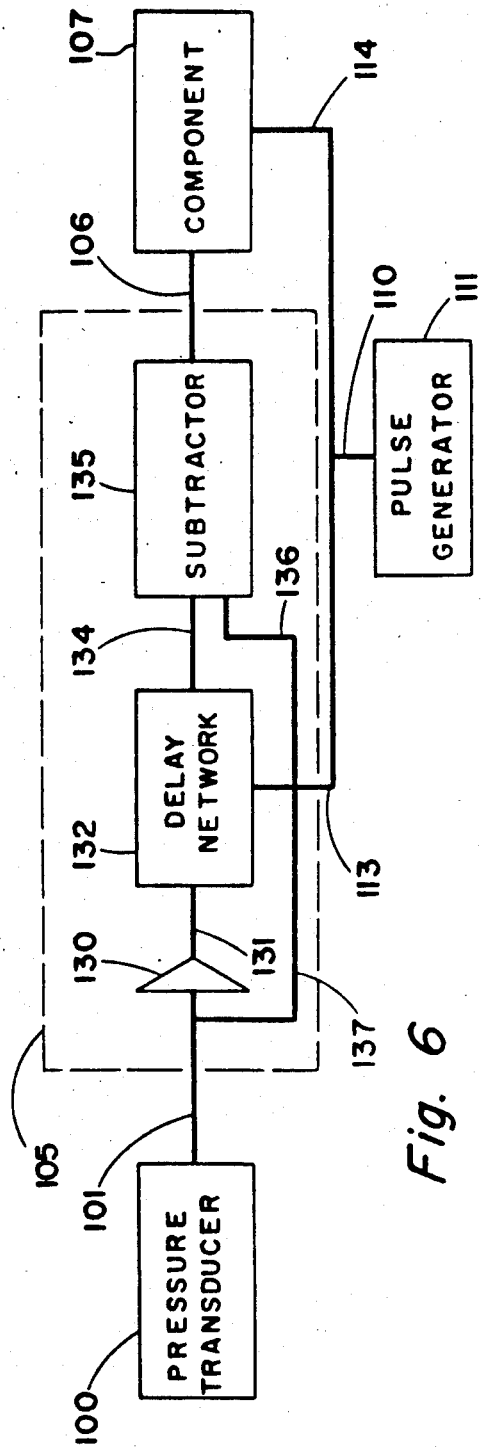
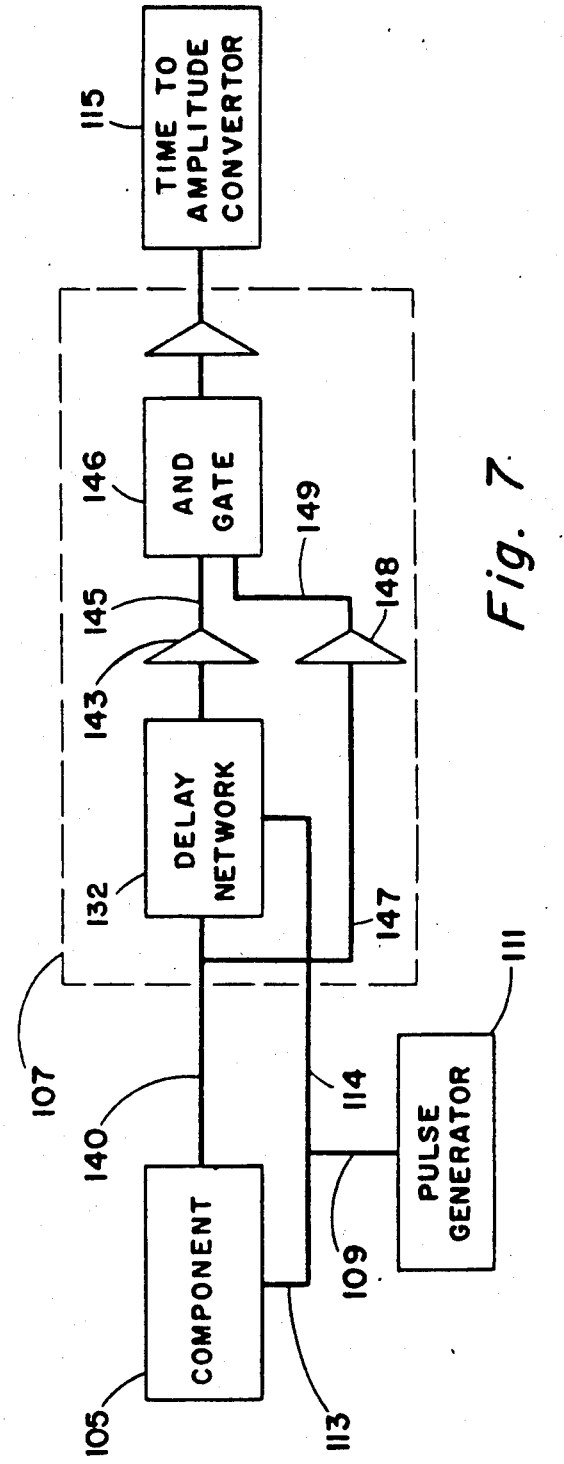
Fig. 6
Fig. 7

METHODS AND APPARATUS FOR REDUCING INTERFERING EFFECTS IN MEASUREMENT WHILE DRILLING OPERATIONS

CROSS-REFERENCE TO RELATED APPLICATIONS

This application is a continuation of a copending application filed June 17, 1982, Ser. No. 389,469, which was a division of an application filed by Serge A. Scherbatskoy on Jan. 10, 1980, Ser. No. 110,848, entitled "IMPROVED SYSTEMS, APPARATUS AND METHODS FOR MEASURING WHILE DRILLING", now U.S. Pat. No. 4,351,037, which was a division of an application filed by Serge A. Scherbatskoy on Dec. 5, 1977, Ser. No. 857,677, entitled "APPARATUS AND METHOD FOR TRANSMITTING AND RECEIVING SIGNALS IN A BOREHOLE", now abandoned.

BRIEF SUMMARY OF THE INVENTION

This invention is concerned with a method and apparatus for attenuating interfering effects in measurement while drilling systems. More specifically this invention deals with arrangements which employ a fluid circulation system and use such system as a communication channel between a transmitter at a selected location within the circulation system for transmitting data signals and a receiver at another location. The receiver receives both the data signals and the interfering signals which are produced in the circulation system. In one embodiment of this invention means has been provided which is responsive to the output of the receiver and is operated in accordance with a selected distinguishable characteristic of the interfering signals. Such means is used to attenuate the signals thereby producing resultant signals in which the information provided by the data signals is accentuated. Such means is independent of the transmission properties of any portion of the circulation system.

FIELD OF THE INVENTION

This invention generally pertains to logging while drilling apparatus, systems and methods and (more particularly) pertains to systems, apparatus, and methods utilizing pressure changes in a drilling fluid circulation system. Specifically this invention deals with apparatus, systems and methods for reducing the effects of interfering pressure changes in measurement while drilling operations.

BACKGROUND OF THE INVENTION

In the drilling of deep boreholes such as oil wells it is desirable to measure certain downhole parameters and to telemeter the information to the surface of the earth. Many efforts have been made to develop a successful telemetering system for performing logging while drilling operations.

For instance in the disclosure of the U.S. Pat. No. 2,096,279 issued to Karcher, a system has been proposed for utilizing electrical conductors inside a drill pipe. Another system has been proposed in the disclosure of the U.S. Pat. No. 2,354,887 issued to Silverman, wherein inductive coupling of a coil or coils with a drill pipe was utilized for transmitting downhole information to the earth's surface. A different system has been described in the U.S. Pat. No. 4,001,773 issued to Lamel, wherein torsional waves travelling along a pipe have been used to convey the useful information.

Perhaps the most promising of these prior art suggestions in a practical sense has been that of signalling by pressure pulses in the drilling fluid. Signalling by pressure pulses can be achieved by means of positive or negative pressure pulses. A positive pressure pulse generator has been described, for instance, in the U.S. Pat. No. 2,787,759 issued to Arps and in the U.S. Pat. No. 3,736,558 issued to Cubberly, Jr. A negative pressure pulse generator has been described, for instance, in the U.S. Pat. No. 3,964,556 issued to Gearhart et al, and in the British Patent Application No. 2,009,473A issued to Scherbatskoy and published June 13, 1979. Positive-pulse systems use a downhole valve which restricts mud flow to the bit to produce a pressure increase or a positive pulse. Negative pulse systems bypass the pressure drop across the bit, thus producing a pressure decrease or a negative pulse.

In various attempts in the prior art to develop a successful telemetering system, a serious problem was caused by the presence of a high level of ambient noise. It has been found difficult, if not impossible, to extract from measurements performed while drilling the useful downhole information. The useful information carrying signal is generally obscured by noise accompanying normal drilling operations. The noise is generated by the cutting of the drill bit into the formations, by the operation of the pump which forces drilling fluid into the circulation system and by various other extraneous causes. This noise is of a magnitude sufficient to seriously interfere with the proper detection of the signal.

A general objective of my invention is to provide a method and apparatus for reducing, as much as possible, the effects of noise generated during normal drilling operations so as to improve the performance of measurements while drilling systems such as those described in the disclosures of U.S. Patents cited above.

Another objective of my invention relates specifically to those telemetering systems which utilize positive or negative pressure pulses in the drilling fluid for transmitting downhole information to the earth's surface. In such systems the main source of noise results from the operation of a pump.

Thus the U.S. Pat. No. 3,302,457 issued to Mayes describes a system for achieving pump stroke elimination by means of a differential pressure transducer which senses a pressure drop across a section of drilling flow path and feeds a current proportional to this differential pressure into an anlog network which represents the drilling fluid flow path. There is an obvious disadvantage in the system proposed by Mayes. It is extremely difficult, if not impossible, to design the required analog network which would provide a reasonable approximation to the drilling flow system in a borehole.

A different approach to the problem of pump strke attenuation has been suggested in the disclosures of the patents as follows: U.S. Pat. No. 3,488,629 issued to Claycomb, U.S. Pat. No. 3,555,504 issued to Fields, U.S. Pat. No. 3,716,830 issued to Garcia, and U.S. Pat. No. 3,747,059 issued to Garcia. In these disclosures a directionally discriminating system has been proposed for effectively cancelling the pressure pulse variations due to the mud pump and for permitting downhole pressure pulse signals from a measuring instrument to be detected at the surface. However, it should be noted that such a directional discrimination does not provide an adequate selectivity which would insure a satisfactory signal to noise ratio for a measurement while drilling system.

Another arrangement for pump stroke attenuation has been suggested by Claycomb in the U.S. Pat. No. 4,262,343.

A different approach for attenuating interfering effects due to pump strokes has been suggested by Foster, et al in the U.S. Pat. No. 3,742,443. In an arrangement described in this patent two transducers are used at spaced points in the fluid circulation system for producing signals representing variations in fluid pressure at these points. These signals are subsequently processed and combined. The processing requires two filters. One of these is a time delay filter and the other is a distortion compensating filter. The design of these filters depends on the transmission characteristics of the fluid circulation system between the two spaced points at which the transducers are located. Such transmission characteristics are difficult to obtain. They would require special measuring equipment and a specialized personnel in addition to the personnel generally used for supervising drilling operations. The arrangement suggested by Foster, et al is cumbersome and impractical in operation.

One of the features of this invention which distinguishes it from the prior art is using an indication representing the interfering effects for enhancement of the signal to noise ratio.

In accordance with another feature of this invention, the recurrence in the pump operation is directly used to develop a subtraction procedure which is effective to improve the signal to noise ratio at the receiving end of the telemetry system.

Other methods and objectives of this invention will be apparent when making reference to the attached claims.

BRIEF DESCRIPTION OF THE DRAWINGS

FIG. 1 is a schematic illustration of a conventional rotary drilling rig showing apparatus of the present invention incorporated therein.

FIG. 2A is a schematic illustration of a physical embodiment of the mud pressure pulse generator together with instrumentation and sensor sections in place in a drill string near the drill bit.

FIG. 2B is a drawing of the mud pressure pulse generator taken in proportional dimensions from an engineering assembly drawing used in actual manufacture of the device.

FIG. 4 is a schematic illustration showing typical aboveground equipment in accordance with a preferred embodiment of the invention, wherein the downhole parameter being sensed is radioactivity.

FIG. 6 is a schematic block diagram showing component 105 of the signal extractor 102 of FIG. 4 in further detail.

FIG. 7 is a schematic block diagram showing component 107 of the signal extractor 102 of FIG. 4 in further detail.

FIG. 10 is a schematic block diagram showing an alternative timing pulse generator that may be utilized.

DETAILED DESCRIPTION OF THE INVENTION

Figure 3A:
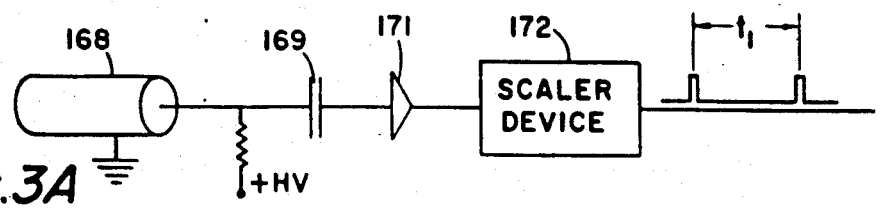
FIG. 3A is a schematic diagram of a radioactivity type sensor and associated instrumentation.

Referring now to FIG. 1, there is schematically illustrated a typical drilling rig 10 including a mud circulating pump 12 connected to a discharge pipe 14, a standpipe 16, a high pressure flexible rotary hose 18, a swivel 20 and a drilling string 22, comprising the usual drill pipe and drill collars, and a jet type bit 26. A short distance above the bit 26, and mounted within drill collar 24, is a mud pressure pulse generator 28 and a sensing and instrumentation unit 30.

The mud pressure pulse generator 28 is of a special design. It generates a series of programmed pulses and, each pulse consists of a short momentary reduction in mud pressure. In one embodiment, this is accomplished by a means including a valve that momentarily opens a passageway between the inside and the outside of the drill collar 24, i.e., the valve controls a passageway between the inside of the drill collar 24 and the annulus 29 formed by the outside of the drill collar and the well bore.

Aboveground equipment, generally designated as 32, is connected to a pressure transducer 100, which in turn is connected to standpipe 16. Alternatively, the transducer 100 could be connected into the stationary portion of swivel 20, if desired.

The mud pressure pulse generator 28 will be described by reference to FIGS. 2A and 2B, which will now be described. FIG. 2A illustrates in schematic form a physical embodiment of the mud pressure pulse generator 28 and associated downhole equipment as it would be installed in the drilling apparatus of FIG. 1. The reference numerals that are applied in FIGS. 1, 2A and 2B refer to corresponding parts. A sub 58, which is typically 6¾" O.D. and 3' long, supports an inner housing 56 by means of arms, or perforated or slotted support members (not shown). The inner housing 56 contains the mud pressure pulse generator 28 and carries at its lower end portion instrumentation sections 62, 66 and sensor section 64. The mud from inside the drill collar 24 passes around the housing 56 in the direction of the arrows. A filter 60 prevents mud solids from entering the housing. The valve 36 is shown to be operated by an actuating device 54. When the valve 36 is open, some mud is bypassed into the annulus 29. The bent arrows show the direction of this bypassed mud. The pressure that forces the mud into the annulus 29 is the pressure across the jets of bit 26. When valve 36 is closed, the bypass to the annulus 29 is closed.

The floating piston 76 separates chamber 72 from an oil filled chamber 78. Actuating device 54 is mounted within an oil filled chamber 80. An equalizing passageway 82, connects chamber 78 with chamber 80. Thus, in cooperation with floating piston 76 and passageay 74, the chambers 72, 78 and 80 are maintained at essentially the same pressure as the chamber 40. Passageway 82 is partially shown in dashed lines in FIG. 2A and is not shown in FIG. 2B since it is located in a different plane from the cross section shown.

It may be noted that in FIG. 2B the actuating device 54 comprises a pair of electrical solenoids arranged in opposition. The winding 55 of the upper solenoid is disposed to exert a force in the upward direction on its armature 57, while the winding 59 of the lower solenoid is disposed to exert a force in the downward direction on its armature 61. The armatures 57, 61 are loosely coupled to a mechanical linkage 63 that is fixed to the shaft 47 so that a "hammer" effect is achieved, i.e., when a solenoid winding is energized, its armature moves a short distance before picking up the load of shaft 47 with a hammer like impact. This "hammer" action has a beneficial effect upon the opening and closing operations of the valve 36. Suitable solenoids for this application are the Size 6EC, medium stroke, conical face, type manufactured by Ledex, Inc., of Dayton, Ohio.

Reverting now to discussion of the mud pressure pulse generator 28, there are several further factors and features that should be considered.

The orifices 52, 53 are made to have smaller opening areas than that of the passageway 48, so that the velocity of mud flow over the sealing surfaces of valve 36 and its seat 37 is significantly reduced when compared to the velocity of mud flow through the orifices 52, 53; thus, concentrating wear on the orifices 52, 53, which are made of wear resistant material (such as boron carbide) and which are also made readily replaceable in the "field," as indicated in FIG. 2B. These small non-erodable orifices 52, 53 make the negative mud pressure pulse generator 28 completely "fail safe," i.e., no matter what happens to the operation of valve 36 (such as being stuck in the open position) the amount of mud that is allowed to flow through the orifices 52, 53 would have no significant adverse effects on the drilling.

The effective area of the valve 36 is somewhat larger than the effective area of the piston 50 on the shaft side and, consequently, when the valve 36 is closed or nearly closed, the force of the shaft 47 is in the direction shown by the arrow in FIG. 2A.

FIG. 2A shows the valve 36 in the "open" condition, i.e., permitting mud flow from valve inlet chamber 42 to valve outlet chamber 44 and via outlet passageway 51 to the annulus 29. The first and second compensator orifices 52 and 53 each provide a predetermined restriction to the mud flow and each causes a pressure drop. Consequently, the pressure inside the chamber 72 can be made to have any value between the maximum pressure inside chamber 44 and the minimum value at the exit of outlet passageway 51 which corresponds to the pressure inside the annulus 29.

Figure 3B:
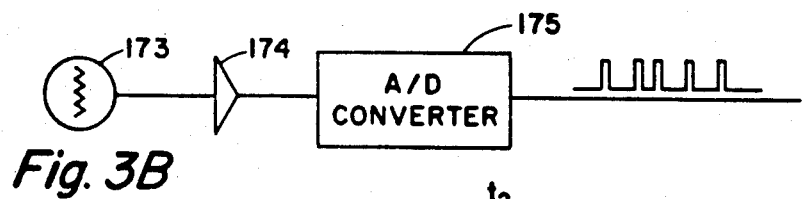
FIG. 3B is a schematic diagram of a temperature type sensor and associated instrumentation.

Two typical sensors are disclosed as examples of the types that can be employed in the operation of the present invention. FIG. 3A illustrates a natural gamma ray sensor and its associated circuitry which in this example is of the analog type. FIG. 3B illustrates a temperature sensor which in this example is of the digital type. Either one of these sensors can be connected to the input terminal of the instrumentation illustrated by FIG. 3C which will be hereinafter described.

With reference to FIG. 3A, a geiger counter 168 is provided with the conventional high voltage supply +HV. The geiger counter 168 generates pulses and is connected through a capacitor 169 to amplifier 171 which generates pulses at its output that correspond to those of the geiger counter 168. A scale of 1024 circuit 172 generates one output pulse for each 1024 geiger counter pulses and its output is shown as pulses having a separation $t_1$. The higher the gamma ray intensity, the higher will be the frequency of the pulses at the output of the scale of 1024 circuit 172 and the smaller will be the time $t_1$.

FIG. 3B illustrates the case of the temperature sensor. The temperature is sensed by a thermistor 173, i.e., a semiconductor that varies in resistance with temperature (it is provided with a suitable power supply, not shown) and it is assumed that the output of the thermistor 173 is a DC voltage proportional to temperature. The amplifier 174 amplifies this DC voltage and impresses it on an analog-to-digital converter 175 which in turn generates a series of binary bytes, one after the other, each representative of a number proportional to the sensed temperature. The outputs of the power amplifiers 185, 186 are utilized to control energization of the windings of the "back-to-back" coupled solenoids (hereinabove described) to actuate the valve 36. When winding 55 is energized the solenoid armature 57 (see FIG. 2B) is moved upwardly, pushing upwardly on shaft 47 to actuate valve 36 to the "open" position. When winding 59 is energized, the solenoid armature 61 is moved downwardly, pulling downward on the shaft 47 to actuate the valve 36 to the "close" position.

Figure 3C:
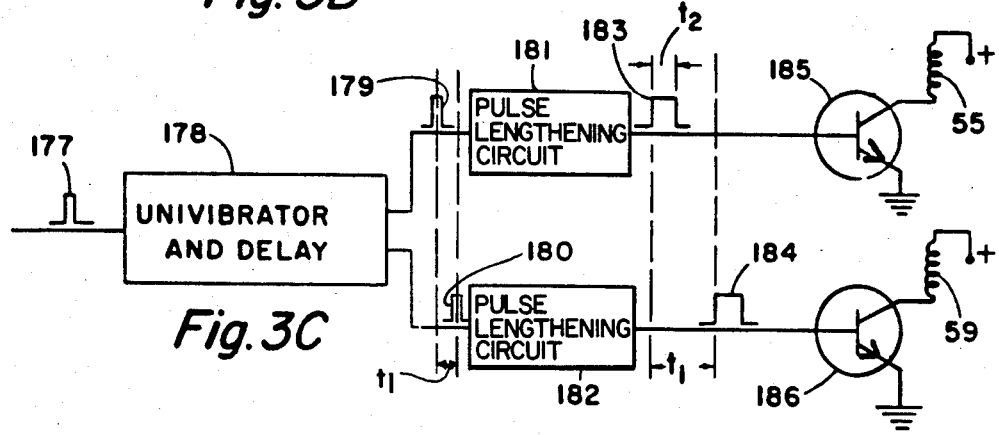
FIG. 3C is a schematic diagram of typical instrumentation for controlling actuation of the valve of the mud pressure pulse generator.

In the sensors utilized in the present invention, the magnitude of the downhole parameter is represented by electric pulses. The sequence of the pulses represents a code (binary or other) and this sequence represents the magnitude of the parameter. FIG. 3C illustrates how each single pulse of this code is processed to operate the valve 36. In FIG. 3C, numeral 177 represents one such pulse which is narrow in time; being only a few microseconds long. This pulse 177 is impressed upon the circuitry contained in block 178. This block 178 contains a so called "one shot" univibrator and suitable inverting rectifying circuits well known in the electronics art and provides (in response to the single input pulse) two output pulses separated in time by $t_1$ (the first pulse is normally time coincident with the input pulse and the second appears later by an amount of time equal to $t_1$) as shown by pulses 179 and 180. These electric pulses 179, 180 are now impressed, respectively, upon the circuitry contained in blocks 181, 182. These two circuits are identical and are so called pulse lengthening circuits, also well known in the electronics art. Each input pulse is lengthened to provide output pulses 183 and 184. These pulses are respectively applied to the "Darlington" power amplifiers 185 and 186 (as manufactured by Lambda Mfg. Co. of Melville, N.Y., and sold under the type PMD16K100).

In the practical design of the electronic logic and power circuitry of FIG. 3C that I use in this preferred embodiment, I have chosen as constants $t_1=500$ milliseconds and $t_2=20$ milliseconds. In operation, when a single pulse 177 is impressed on lead 167, the Darlington 185 is turned on for 20 milliseconds and then turned off. Then 500 milliseconds later the Darlington 186 is turned on for 20 milliseconds and the turned off. Thus, the valve 36 is opened for 500 milliseconds without requiring any energy during this period. Energy is required only during the short 20 millisecond periods that are required to actuate the valve 36 to the "open" or to the "close" position. The figures given above are for illustrative purposes only. Suffice it to say that by making the action of the valve 36: (a) very fast and (b) bi-stable; very high pressures and volumes of mud can be valved without the necessity of employing large amounts of energy and relatively small energy batteries can operate the valve about one million times.

Additional and more detailed information regarding the structure and operation of the mud pressure generator 28 as illustrated in FIGS. 2A and 2B is given in the U.S. Pat. No. 4,351,037 issued Sept. 21, 1982 of which this application is a division, said U.S. Pat. No. 4,351,037 being specifically incorporated into this specification as a reference.

It should also be noted that the mud pressure generator as illustrated in FIGS. 2A and 2B is a negative pressure pulse generator since bypassing the pressure drop across the bit causes a decrease in pressure whereby a negative pressure pulse is produced; however, it should be noted that other types of pulse generators can be used for the purposes of my invention. For instance, the mud pressure generator 28 of FIG. 1 may be a positive pressure pulse generator which restricts mud flow to produce increases in pressure such as shown by Arps in U.S. Pat. No. 2,787,759.

Above ground equipment utilized with the present invention, particularly as to methods and apparatus for eliminating interfering effects that are present in the output of pressure transducer 100, can take various forms, as will now be described.

FIG. 4 shows typical above ground equipment in accordance with a preferred embodiment of the invention, wherein the downhole parameter being sensed is the radioactivity of formations transversed by the bore while drilling is in progress. The corresponding portion of the logging equipment which is below the earth's surface has been previously described and shown in FIGS. 2A, 2B and 3A to 3C.

Referring now to FIG. 4, pressure transducer 100 connected to the standpipe 16 converts the variation of mud pressure within the standpipe into a varying electrical voltage. This voltage represents a mixture of two component signals: the useful, information carrying signal and the interfering signal. The information carrying signal is a succession of short, negative mud pressure pulses produced by the sudden openings and closings of the valve 36. The interfering signal is in the form of relatively slow and periodic pressure variations which are generated by the strokes of the mud pump 12. These mud pump signals tend to mask or obscure the information one desires to obtain by utilizing the short negative mud pressure pulses.

One of the objectives of this invention is to recover, from the "contaminated" signal produced by the transducer, a "clean" signal which gives the desired information. This is accomplished by means of a signal extractor 102 which is applied to the output terminal 101 of the pressure transducer 100. The signal extractor eliminates the interfering effects and produces across its output terminal 108 a succession of pulses from which the information regarding the downhole parameter can be readily obtained.

The signal extractor 102 is controlled in a predetermined manner by a succession of timing pulses obtained from a pulse generator 111 and applied to the control terminals 113, 114. The pulse generator 111 is mechanically driven by the mud pump 12 to produce an appropriate number of timing pulses per revolution of the pump. A chain drive transmission assembly 112 is provided for this purpose.

The "clean" information carrying signal obtained from the extractor 102 is in the form of pulses derived from the actuation of valve 36 of generator 28. The relevant information is provided by the time intervals separating the pulses. A time-to-amplitude convertor 115 connected to the signal extractor output terminal 108 converts these pulses derived from the actuation of the valve 36 of generator 28 into signals having magnitudes representing the intervals therebetween. The converter 115 is a well known electronic device and can be made up of components manufactured by the Burr-Brown company of Tucson, Ariz., U.S.A. For further detailed description of time-to-amplitude converters see: M. Bertolaccini and S. Cova, "*Logic Design of High Precision Time to Pulse Height Converters*", Nuclear Instruments and Methods 121 (1974), pp. 547–566, North Holland Publishing Co.

The signals derived from the converter 115 are in turn applied to the input terminal 109 of a reciprocation circuit 118. The reciprocation circuit 118 (as, for example, manufactured by Analog Devices, Inc. of Norwood, Mass.) produces output voltages which are the reciprocals of the input voltages. Thus, if a voltage of magnitude M is applied to reciprocation circuit 118, an output voltage having magnitude 1/M is obtained. These signals having magnitudes 1/M are in turn recorded on the chart of a recorder 120. The record chart of recorder 120 is moved in correlation with changing depth of the sensor unit 30 by a depth sensing device 121. The depth sensing device may be, for example, a modification or adaptation of equipment such as marketed by The Geolograph Medeavis Company of Oklahoma City, Okla. U.S.A.

Figure 5:
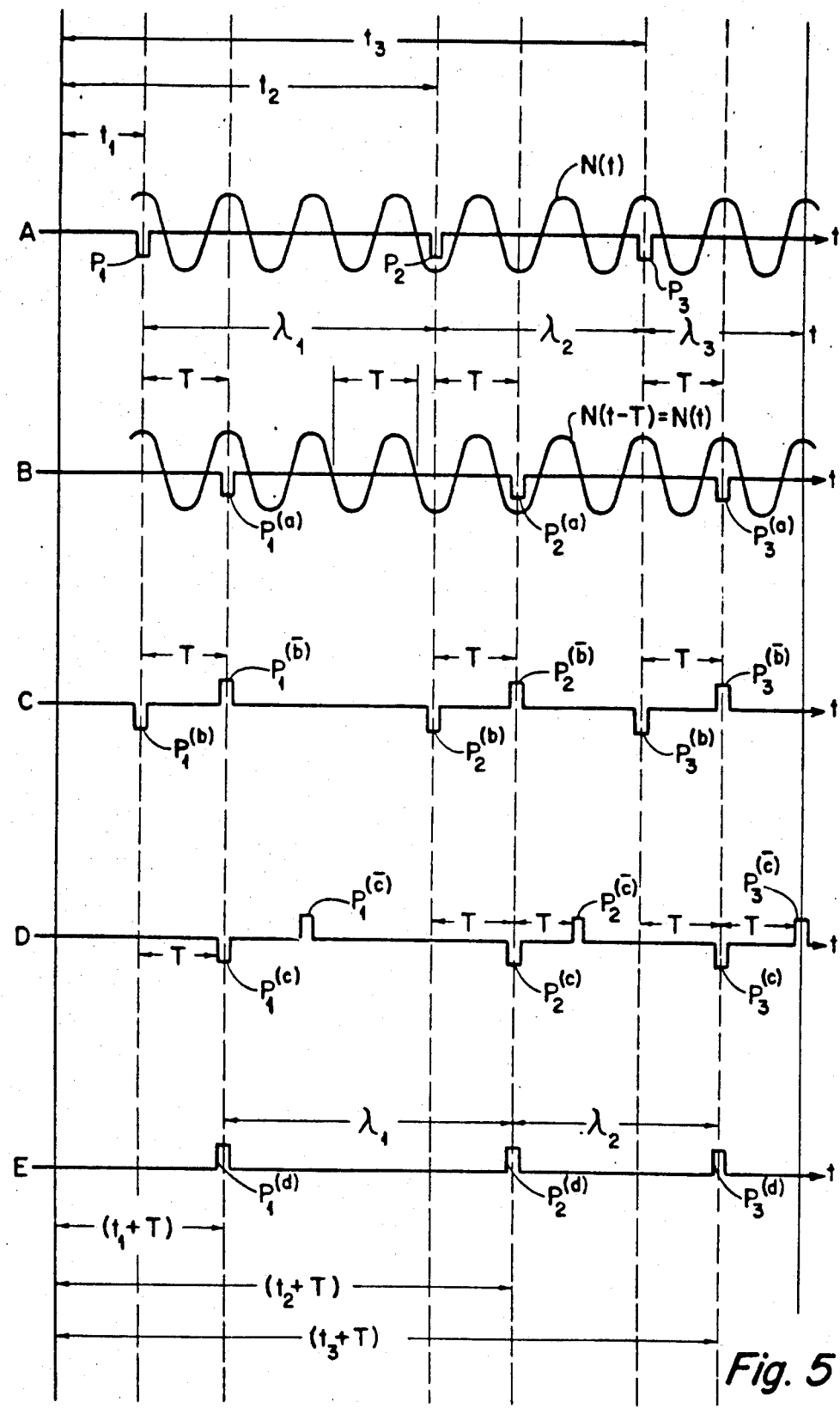
FIG. 5 is a graphic illustration, in idealized form, showing certain wave forms and pulses and time relationships to aid in explanation of the signal extractor portion 102 of FIG. 4.

In Order to show more clearly the operating features of the signal extractor 102, we will analyze the behavior of the various signals which are involved. They are shown schematically in a simplified and idealized form as they vary with time in FIG. 5. Let $$F(t) = S(t) + N(t) \tag{1}$$

where S(t) is the useful information carrying signal formed by the negative mud pressure pulses $P_1$, $P_2$, and $P_3$ aligned along the time axis t. [See FIG. 5 (axis A)]. The times of arrival of these pulses, which correspond to the times of actuation of the valve 36 of generator 28, are $t_1$, $t_2$ and $t_3$, respectively. The time intervals which separate these pulses are $\lambda_1 = t_2 - t_1$; $\lambda_2 = t_3 - t_2$; $\lambda_3 = t_4 - t_3$; etc. are indicative of the intensity of the radiation measured. If these time intervals are large, the intensity is relatively weak and conversely, if they are small, the intensity is relatively strong. The interfering signal produced by the mud pump 12 is represented in FIG. 5 (axis A) by a periodic but not necessarily sinusodal function N(t) having a period T. The length of the period is related to the speed of rotation of the pump.

To facilitate explanation, the relative scales in FIG. 5 have been distorted. In actual practice, there may be 50 to 80 oscillations of N(t) between the times of arrival of $P_1$ and $P_2$. Thus, $\lambda_1$ and $\lambda_2$ may vary from 50T and 80T. However, in FIG. 5 (axis A) only a few oscillations of N(t) beteen $P_1$ and $P_2$ have been shown. Furthermore, in actual practice the negative mud pressure pulses $P_1$, $P_2$, $P_3$ do not have clean rectangular forms as in FIG. 5 (axis A). Moreover, the actual pulses are much smaller than those which have been shown in FIG. 5 (axis A).

In actual experience, the magnitude of $P_1$, $P_2$ or $P_3$ is about 0.1 to 0.01 of the maximum amplitude of the pulsations $N(t)$.

Axes A–E in FIG. 5 are positioned one below the other so that one can compare the signals in their time relationships one to another. Using these figures, we can now enumerate the instrumental steps which are involved in the operation of the signal extractor 102. These are as follows:

Step 1 We displace the input $F(t)$ by an amount T, to obtain $$F(t-T) = S(t-T) + N(t-T) \quad (2)$$

where $S(t-T)$ and $N(t-T)$ are, respectively, the displaced, useful signal and displaced interfering signal. Both signals are shown in FIG. 5 (axis B). The signal $S(t-T)$ is represented by pulses $P_1^{(a)}$, $P_2^{(a)}$ and $P_3^{(a)}$ which have been obtained by displacing by an amount T the corresponding pulses $P_1$, $P_2$ and $P_3$ in FIG. 5 (axis A). The signal $N(t-T)$ in FIG. 5 (axis B) is shown to be in exact synchronism with $N(t)$ in FIG. 5 (axis A). This is due to the periodicity of the signal. Thus, $$N(t-T) = N(t) \quad (3)$$

Step 2 We subtract the displaced input function $F(t-T)$ from the original input function $F(t)$ to obtain $$M(t) = F(t) - F(t-T) \quad (4)$$

Taking into account (1), (2) and (3), we obtain $$M(t) = S(t) - S(t-T) \quad (5)$$

Thus, the interfering signal has been eliminated and does not appear in $M(t)$. This can also be seen from inspection of FIG. 5 (axes A and B).

As shown in FIG. 5 (axis C), $M(t)$ consists of impulses which occur in pairs. Each pair contains a negative and a positive pulse separated one from another by a time interval T. Thus, we observe a pair consisting of $P_1^{(b)}$ and $P_1^{(\bar{b})}$ which is followed by a succeeding pair consisting of $P_2^{(b)}$ and $P_2^{(\bar{b})}$, then by another pair consisting of $P_3^{(c)}$ and $P_3^{(\bar{c})}$ and so on.

Step 3 We displace $M(t)$ by a time T so as to obtain $M(t-T)$. Thus, the entire sequence of pulses in FIG. 5 (axis C) is shifted along the time axis by T so as to appear as shown in FIG. 5. (axis D). The arrangement of pulses as in pairs has been preserved in FIG. 5 (axis D). However, each pair such as $P_1^{(c)}$ and $P_1^{(\bar{c})}$ is displaced with respect to the pair $P_1^{(b)}$ and $P_1^{(\bar{b})}$ [shown in FIG. 5 (axis C)] by T. Similarly, the pair $P_2^{(c)}$ and $P_2^{(\bar{c})}$ is displaced with respect to the pair $P_2^{(b)}$ and $P_2^{(\bar{b})}$ by T, and so on.

Step 4 We compare the displaced pulses in FIG. 5 (axis D) with those in FIG. 5 (axis C). We note that some of these in FIG. 5 (axis D) are in time coincidence with some of the pulses in FIG. 5 (axis C). The instances at which coincidence occurs are recorded in FIG. 5 (axis E) as pulses $P_1^{(d)}$, $P_2^{(d)}$ and $P_3^{(d)}$. Thus, $P_1^{(d)}$ coincides with $P_1^{(\bar{b})}$ and $P_1^{(c)}$
$P_2^{(d)}$ coincides with $P_2^{(\bar{b})}$ and $P_2^{(c)}$
$P_3^{(d)}$ coincides with $P_3^{(\bar{b})}$ and $P_3^{(c)}$ The times at which the pulses $P_1^{(d)}$, $P_2^{(d)}$ and $P_3^{(d)}$ occur are $t_1+T$, $t_2+T$ and $t_3+T$, respectively.

The pulses $P_1^{(d)}$, $P_2^{(d)}$ and $P_3^{(d)}$ correspond to the pulses $P_1$, $P_2$ and $P_3$ shown in FIG. 5 (axis A). Consequently, the pulses in FIG. 5 (axis E) also represent the useful function which now is $S(t-T)$ since it has been displaced by T. It is evident that the pulses in FIG. 5 (axis E) provide the information which we are seeking to obtain. The time interval between $P_1^{(d)}$ and $P_2^{(d)}$ is $\lambda_1$, and the time interval between $P_2^{(d)}$ and $P_3^{(d)}$ is $\lambda_2$, etc. The quantities $\lambda_1$, $\lambda_2$, etc. are indicative of the radiation measured by the gamma ray detector.

The above steps will now be considered as they relate to the performance of the signal extractor 102 and more particularly to that of its two component parts designated in FIG. 4 as 105 and 107 and shown schematically in FIGS. 6 and 7, respectively.

The component 105 receives at its input terminal 101 (which is the same as that of the signal extractor 102 of FIG. 4) the signal $F(t)$. As shown in FIG. 6, this signal is transmitted through an amplifier 130 to the input terminal 131 of a delay network 132. The delay network delays $F(t)$ by T, thus, producing at its output terminal 134 the signal $F(t-T)$. This signal is a sum of two component signals $S(t-T)$ and $N(t-T)$ which are shown in FIG. 5 (axis B).

The signal $F(t-T)$ is applied to one input terminal 134 of a subtractor 135. The other input terminal 136 of the subtractor receives directly the signal $F(t)$, which is transmitted from terminal 101 by means of conductor 137. Thus, at the output terminal 106 of the subtractor 135 we obtain the difference signal $M(t) = F(t) - F(t-T)$. This is shown in FIG. 5 (axis C).

The delay network 132 is provided with control terminal 113 which receives a signal controlling the delay T. It is important that the length of the delay T be the same as the period of mud pressure oscillations produced by the mud pump 12.

The amount of the delay T is controlled by the timing pulses derived from pulse generator 111 shown also in FIG. 4 and applied via conductor 110 to the control terminal 113. It is noted that the delay T is the same as the period of oscillation of mud pressure produced in the succesive strokes of the mud pump 12. Consequently, the frequency of these timing pulses must be controlled by the rotation of the pump.

Assume that the pump produces $N_1$ strokes per second. Thus, $T = 1/N_1$. The pulse generator 111 produces timing pulses at a relatively high rate $N_2$, which is a multiple of $N_1$. Thus, $N_2 = KN_1$, where K is a constant which has been chosen to be 512. Thus, if the strokes of the pump are one per second this would require the signal generator to produce 512 pulses per second. It is apparent that the rate of pulsation of the mud pump 12 varies with time and, accordingly, $N_2$ will vary so as to insure that the delay produced by delay network 132 will always be equal to one period of the mud pressure oscillations produced by the mud pump 12.

The delay network 132 which is controlled, as described above, may be a Reticon Model SAD-1024 Dual Analog Delay Line as marketed by Reticon Corporation, Sunnyvale, Calif., U.S.A.

The instrumental steps herebefore described are the steps 1 and 2 performed by the component 105 of the signal extractor 102. We have transformed the input signal $F(t)$ [represented by its components in FIG. 5 (axis A) into an output signal $M(t)$ which appears as a succession of pairs of pulses and is shown in FIG. 5 (axis C). We will now proceed to describe further instrumental steps which are required in order to accomplish the desired objectives. These are performed by the component 107 of the signal extractor 102.

We refer now to FIG. 7. The signal M(t) is now applied through conductor 140 to a delay network 132. This delay network is identical to that designated as 132 in FIG. 6. It receives, at its control terminal 114, the same control signal which was applied to the control terminal 113 of the delay network 105. Consequently, the amount of delay produced by delay network 132 is T and the signal appearing at the output of 132 is M(t−T) as shown in FIG. 5 (axis D). This output signal is transmitted through an amplifier 143 to one input terminal 145 of an AND gate 146. At the same time, the undelayed signal M(t) is applied through the conductor 147 and amplifier 148 to the other input terminal 149 of the AND gate 146. These two input signals M(t) and M(t−T) which are applied to the AND gate 146 are shown in FIG. 5 (axes C and D), respectively. We have previously observed that some impulses shown in FIG. 5 (axis C) occur in coincidence with impulses in FIG. 5 (axis D). Those impulses that occur in coincidence appear in the output of the AND gate 146. They are designated in FIG. 5 (axis E) as $P_1^{(d)}$, $P_2^{(d)}$ and $P_3^{(d)}$. These coincident pulses are the output of pulses of the component 107, and consequently of the signal extractor 102.

It is thus apparent that by means of the component 107, we have performed the instrumental steps 3 and 4. We have transformed the signal M(t) shown in FIG. 5 (axis C) into the signal S(t−T) shown in FIG. 5 (axis E). The latter provides the quantities $\lambda_1$, $\lambda_2$, $\lambda_3$, etc., which represent the information it was desired to obtain. It should be recalled that the signal S(t−T) is represented by a succession of pulses as shown in FIG. 5 (axis E). These pulses are transmitted to the time-to-amplitude converter 115 to produce at the output of the time-to-amplitude converter 115 signals of various magnitude such as $\lambda_1$, $\lambda_2$, $\lambda_3$, etc., that represent time intervals between the arrival of pulses. These signals are in turn fed to and transformed by the reciprocation circuit 118 of FIG. 4 into reciprocal signals having magnitudes $1/\lambda_1$, $1/\lambda_2$, $1/\lambda_3$, respectively. These reciprocal signals are recorded by recorder 120 of FIG. 4. It is apparent that the quantities $1/\lambda_1$, $1/\lambda_2$, $1/\lambda_3$ represent the intensity of radioactivity of formations sensed by the sensor unit 30 at various depths in the borehole.

Figure 8:
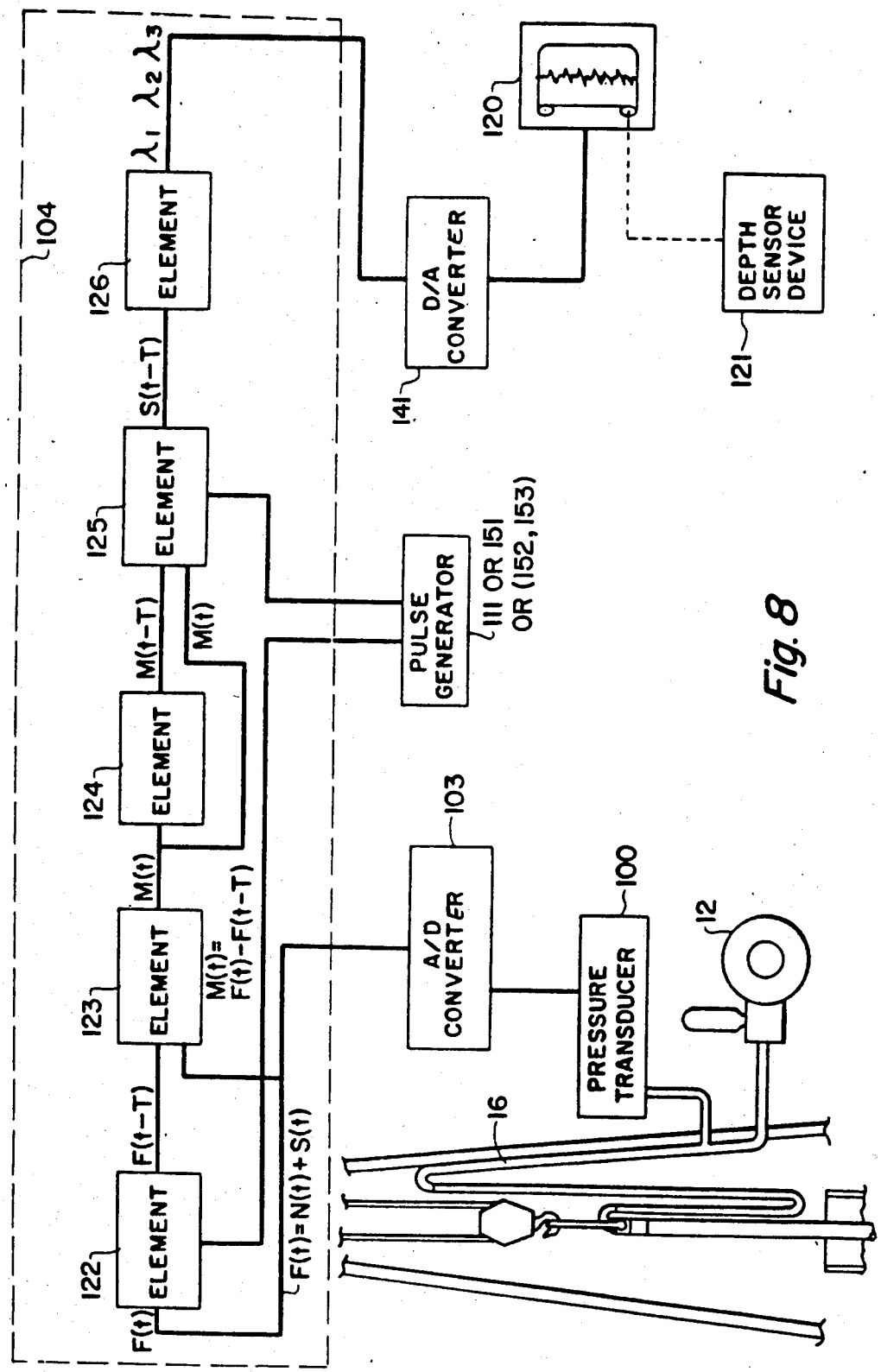
FIG. 8 is a schematic block diagram showing another form of aboveground equipment that may be utilized.

We have described above an instrumental means for performing logical steps leading from the function F(t) to a function S(t−T). These steps have been performed by representing these functions in an analog (non-digital) form. Alternatively, if desired, the entire process can be digitalized, as shown diagrammatically by FIG. 8. In FIG. 8, the output of the pressure transducer 100 is fed to an analog-to-digital converter 103, the output of which is fed to a digital computer 104. The operations indicated in FIG. 8 are performed by the elements designated 122, 123, 124, 125, and 126 in the digital computer 104. Timing signals from a pulse generator 111 or 151 or (152, 153) are introduced to the digital computer 104 in order to control the delays in accordance with the pump speed. The operations indicated in the dotted rectangle of FIG. 8 are performed mathematically in a sequence which may be flow charted. The output of the computer 104 is fed to a digital-to-analog converter 127, the output of which is fed to the recorder 120.

Figure 9:
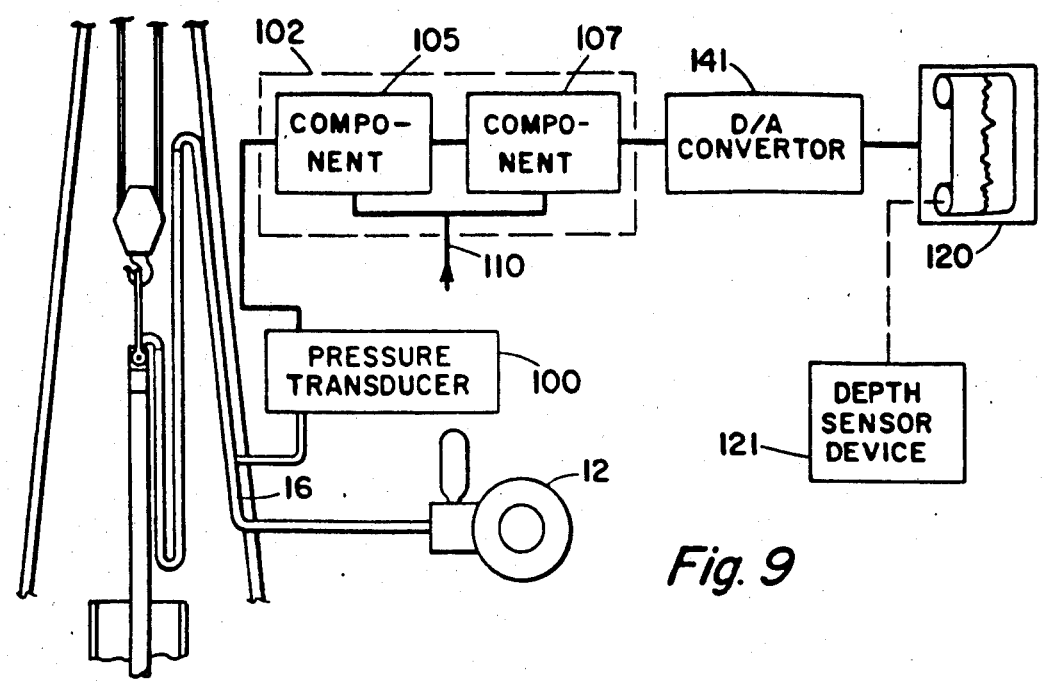
FIG. 9 is a schematic block diagram showing still another form of aboveground equipment that may be utilized.

In FIG. 9, there is shown an arrangement similar in some respects to that of FIG. 4, but wherein the data to be obtained and recorded are the temperature at the location of sensor unit 30 of FIG. 1. In FIG. 9, these data, as presented to the signal extractor 102 are in ditigal form (see FIG. 3B). The signal extractor 102 of FIG. 9 is identical to that of FIG. 4, but the time-to-amplitude converter 115 and the reciprocation circuit 118 of FIG. 4 are replaced by a digital-to-analog converter 141. The output signals of an appropriate pulse generator will be applied to the control terminal 110 of the signal extractor 102.

It is not always convenient to provide a mechanical connection to the mud pump 12, as shown by the chain drive transmission assembly 112 in FIG. 4, and an alternate means for generating the pulses required for the signal extractor may be desirable. FIG. 10 illustrates such an alternate means. In a typical example, the signal extractor 102 of FIG. 4 is provided at its terminal 110 with pulses at a rate of 512 pulses per full pump stroke. It must be clearly understood that this rate must be rigorously synchronized with the pump strokes. All the "times" shown as T, $t_1$, $t_2$, etc. in FIG. 5 are not so-called "real time", but are directly related to the speed of the mud pump 12 and rigorously, T, $t_1$, $t_2$, etc. should be expressed, not in seconds or minutes of "time" but in "gallons of mud". When it is said that at terminal 110 of FIG. 4, there are 512 pulses per mud pump stroke, it is meant that at terminal 110 there are present voltage pulses having a frequency equal to the 512th harmonic of the pump stroke frequency. FIG. 10 shows how this can be accomplished without mechanical connection to the pump shaft.

In FIG. 10, component 145 is a VCO or "voltage controlled oscillator" which at its output 110 produces electric pulses the frequency of which is controlled by the DC voltage applied at its input terminal 108. Component 150 is a binary divider or scaler that divides the frequency of the pulses impressed on its input terminal 116 and generates output pulses at its output terminal 117 having a frequency equal to 1/512th of frequency of the input pulses. Component 119 is a phase comparator that compares two inputs (one from scaler output terminal 117 and one from the output terminal 130 of pressure transducer 100), and provides at its output terminal 128 a voltage which is zero volts DC when the two inputs 117 and 130 are exactly equal in phase; and provides a positive voltage when the input at 117 leads the input at 130 in phase; and a negative DC voltage when the input at 117 lags the input at 130 in phase. A battery 129 is provided to properly bias the VCO 145. The circuit 151, just described, is known as "phase locked loop". The operation is best explained by an example: Assume that the pump pulse frequency (pump stroke frequency) is 1 Hz and the VCO is generating 512 Hz. The output of the scaler 150 will then generate exactly 1 Hz. The 1 Hz from the scaler 150 and the 1 Hz from the pressure transducer 100 will then be exactly matched in frequency and phase and the output of the comparator at terminal 128 will be zero volts, and the VCO 145, when properly biased by battery 129, will generate exactly 512 pulses per stroke.

Assume now that the mud pump 12 speeds up. The frequency at terminal 130 will than be somewhat greater than 1 Hz—i.e., $1+\Delta_1$ Hz. The comparator 119 will then provide an output at terminal 128 which will no longer be zero volts DC, but for example, $+\Delta_2$ V, this small voltage increment will be applied to the VCO 145 at terminal 108 and increase its frequency until the nominal 512 pulses per second is increased to a value f such that $f/512 = 1+\Delta_1$.

Thus, the frequency at terminal 110 will always accurately follow the frequency of the mud pump 12 and will always be its 512th multiple.

Figure 11:
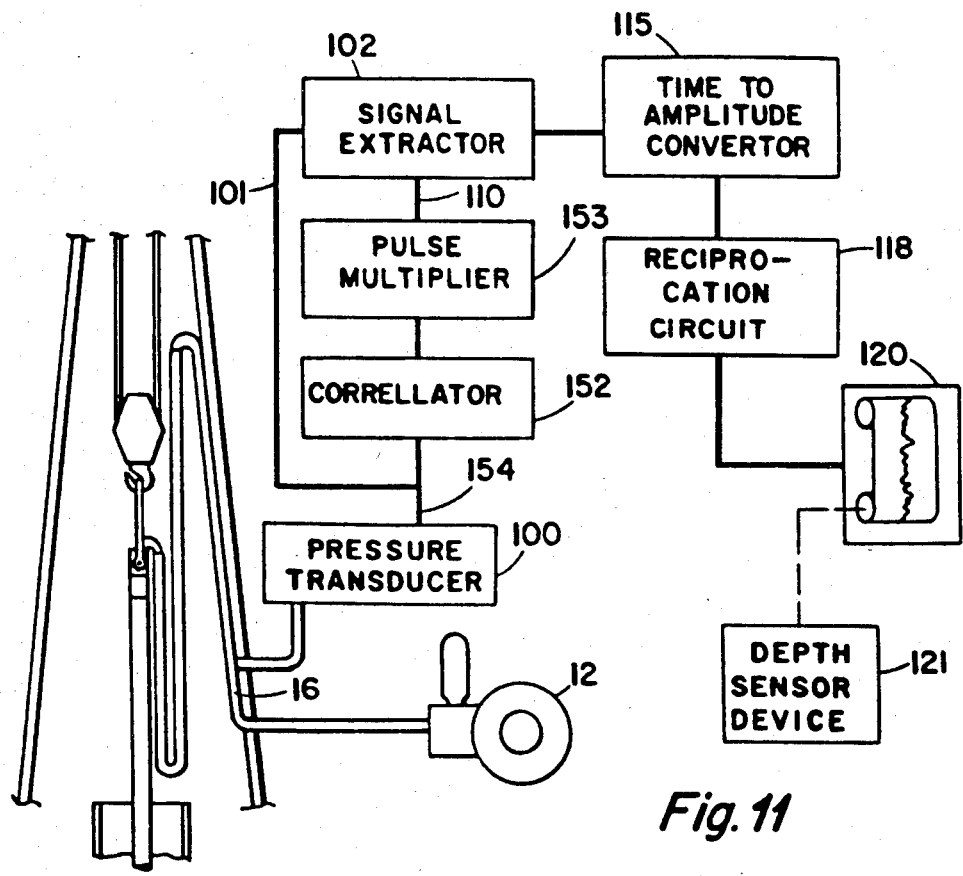
FIG. 11 is a schematic block diagram showing still another form of aboveground equipment that may be utilized.

Two arrangements for obtaining timing pulses for the signal extractor 102 have been hereinabove described (pulse generator 111 of FIG. 4 and the "phase locked loop" circuit 151 of FIG. 10). A third arrangement that may be used for obtaining such timing pulses is illustrated by FIG. 11 and is based on "auto-correlation". In FIG. 11, the input terminal 154 of a correlator 152 is supplied by the output of the pressure transducer 100, and receives the function F(t) which contains the periodic signal N(t) and the function S(t) which may be considered a random function. The output of the pressure transducer 100 is also applied to the input terminal 101 of the signal extractor 102. The correlator 152 is adapted to produce across its output terminals the auto-correlation function of F(t) which is $$\phi_{ff}(\tau) = \overline{[S(t) + N(t)][S(t+\tau) + N(t+\tau)]} \quad (6)$$

Where the bar in the above expression indicates averaging over an appropriate period of time. The function $\phi_{ff}(\tau)$ can be expressed as $$\phi_{ff}(\tau) = \phi_{ss}(\tau) + \phi_{nn}(\tau) \quad (7)$$

where $$\phi_{ss}(\tau) = \overline{S(t)S(t+\tau)} \quad (8)$$

and $$\phi_{nn}(\tau) = \overline{N(t)N(t+\tau)} \quad (9)$$

The function $\phi_{ss}(\tau)$ reaches zero at some value of $\tau = \tau_o$ and beyond $\tau_o$, we have $$\phi_{ff}(\tau) = \phi_{nn}(\tau) \quad (10)$$

Since $\phi_{nn}(\tau)$ is periodic, the function $\phi_{ff}(\tau)$ is also periodic and it has the period $\tau$. This function, which is obtained in the output of the correlator 152 is in turn applied to a pulse multiplier 153 which produces a succession of timing pulses similar to those produced by the pulse generator 111 in FIG. 4 and which are applied to input terminal 110 of the signal extractor 102. The pulse multiplier 153 multiplies the frequency of the input pulses by a phase locked loop system similar to that of FIG. 10 or by any other conventional means. The remaining elements in FIG. 11 are the same as those in FIG. 4, except, of course, that the pulse generator 111 and its chain drive transmission assembly 112 are eliminated.

There are commercially available instrumental means based on auto-correlation for recovering a periodic signal from a mixture of a periodic and a random signal (see, for example, *Statistical Theory of Communications*, by Y. W. Lee, John Wiley, New York, N.Y., 1960, pp. 288-290). The correlator 152 of FIG. 11 may be Model 3721A manufactured by Hewlett Packard Company of Palo Alto, Calif. The correllator 152 could also be one of the types described in the following references: A. E. Hastings and J. E. Meade "A Device for Computing Correlation Functions", *Review of Scientific Instruments*, Vol. 23, 1952, pp. 347-349; and F. E. Brooks, Jr. and H. W. Smith, "A Computer for Correlation Functions", *Review of Scientific Instruments*, Vol. 23, 1952, pp. 121-126.

The steps for carrying out one method of the present invention can be stated as follows:

(a) inserting a drill string into said borehole and circulating drilling fluid so that a substantial fluid pressure drop is produced at a localized region in said borehole;

(b) sensing the magnitude of a downhole parameter in said borehole and generating a sequence of electric pulses, the sequence being representative of the magnitude of said parameter;

(c) generating sequential negative drilling fluid pressure pulses responsively to said electric pulses; and (d) detecting said sequential pulses at the surface of the earth; generating a signal responsively thereto and translating said signal into an indication representative of said magnitude.

While I have shown my invention in several forms, it will be obvious to those skilled in the art that it is not so limited, but is susceptible of various changes and modifications without departing from the spirit thereof.

I have disclosed herein, as examples, sensors for only two downhole parameters, it is, however, to be understood that sensors for various other downhole parameters could be used as well. It is also to be understood that sensors for a plurality of downhole parameters may be used at the same time, in which case, conventional techniques would be employed (such as time sharing, multiplexing, or the like) to handle the data representing the plurality of parameters.

When deviated or inclined wells are drilled, a turbine or "mud motor" such as a Dynadrill, manufactured by Smith Industries, Inc., Houston, Tex., is frequently employed. In such case, the drill string 31 of FIG. 1, is not rotated by the rotary table at the surface. The rotating action to turn the bit 26 is derived from such a mud motor, which usually is located immediately above the bit 26 in the drill string comprising elements 22, 24, 28, 30 fo FIG. 1. When such a mud motor is employed, a large pressure drop occurs across it (since the mud motor derives its power from the mud flow). This large pressure drop can be utilized to supply the pressure difference between the inside of the drill string and the annulus and, in such case, a "jet" type bit need not be employed.

The presence of the pressure drop across the mud motor merely enhances the operation of my invention so long as the negative mud pressure pulse generator is located above the mud motor.

The term "flow restriction means", for purposes herein, applies to either a jet type bit, or a mud motor, or both. The term "high pressure zone" applies to the drilling fluid pressure on the upstream side of the "flow restriction means" and the term "low pressure zone" applies to the drilling fluid pressure on the downstream side of the "flow restriction means".

It is recognized that, in some instances, a plurality of mud pumps are employed on a single drilling rig and these pumps are not necessarily operated in synchronism.

In an example of three pumps, the periodic pressure curve of FIG. 5A would, in the practical case, not be a simple periodic function as shown by N(t) but would be the sum of three components, each component being periodic and having its own distinct period.

By the employment of three delay systems, as shown in FIG. 6, each synchronized with its own pump, each periodic component of the interfering mud pulse pressure signal can be separately nullified. Suitable interconnection will then produce a signal from which the interfering mud pump pressure signals are eliminated.

The foregoing disclosure and the showings made in the drawings are merely illustrative of the principles of this invention and are not to be interpreted in a limiting sense.

What is claimed:

1. A telemetering arrangement for use in conjunction with drilling operations of a borehole for transmitting information expressed in terms of data signals and employing a fluid circulation system including mud pump means wherein interfering signals having a distinguishable characteristic are produced, said distinguishable characteristic resulting from pressure changes which are induced in the fluid of said circulation system by the drilling operations and are recurrent in accordance with an identifiable pattern, and wherein said circulation system forms at least in part a communication channel between a transmitting means at a first location for transmitting data signals representing said information, and a signal receiving means at a second location, said signal receiving means being operable to receive a mixture of said data signals and of said interfering signals to produce electrical mixed signals representing said mixture, said arrangement comprising,
- means operable independent of transmission properties of any portion of said circulation system for producing electrical control signals representative of said identifiable pattern,
- electronic processing apparatus comprising signal extractor means to which said electrical mixed signals are applied, and which is controlled by said electrical control signals to produce processed signals in which interfering signals are diminished, and
- means for deriving said information from said processed signals.

2. The telemetering apparatus of claim 1 in which said electronic processing apparatus includes means for time displacing said electrical mixed signals.

3. The telemetering apparatus of claim 2 in which said means for time displacing displaces said electrical mixed signals by a variable time interval.

4. The telemetering arrangement of claim 1 wherein said signal extractor means includes first means for producing time displaced electrical mixed signals that are displaced in time one with respect to the other by a variable time interval and a second means for mathematically combining said time displaced electrical mixed signals to produce said processed signals.

5. The telemetering arrangement of claim 4 wherein said displaced electrical signals are mathematically combined to obtain their difference by the subtraction of one from the other.

6. The telemetering arrangement of claims 2 or 4 in which said means for time displacing is responsive to said electrical control signals.

7. The telemetering arrangement of claim 3 wherein said variable time interval is dependent on said electrical control signals.

8. The telemetering arrangement of claim 3 wherein said variable time interval is dependent upon the rate of pulsation of said pump means.

9. The telemetering arrangement of claim 3 in which said variable time interval is made up of multiple increments of time and wherein said control signals occur in a time succession representing said increments of time.

10. The telemetering arrangement of claim 1 in which said interfering signals are recurrent signals and in which said distinguishable characteristic is the recurrence of said interfering signals.

11. The telemetering arrangement of claim 10 wherein said recurrent signals recur at successive intervals of time and wherein said electrical control signals occur in a time succession representing said intervals of time.

12. The telemetering arrangement of claim 1 wherein said pressure changes are periodic changes and wherein said electrical control signals represent the periodicity of said pressure changes.

13. The telemetering arrangement of claim 1 wherein said pressure changes are cyclical and wherein said electrical control signals represent the periodicity of the cycles of said pressure changes.

14. The telemetering arrangement of claims 10, 11 or 12 in which said recurrent signals comprise more than one recurrent component and in which said processing apparatus is operated in accordance with the periodicity of each of said components.

15. The telemetering arrangement of claim 1 in which said means for producing said electrical control signals includes means for deriving said electrical control signals from said electrical mixed signals.

16. The telemetering arrangement of claims 1 or 10 in which said pump means has a rate of pulsation and said means for producing said electrical control signals includes means for deriving said electrical control signals from said rate of pulsation.

17. The telemetering apparatus of claim 15 in which said means for deriving said electrical control signals comprises means for averaging said electrical mixed signals to produce electrical control signals in which said distinguishable characteristic is salient.

18. The telemetering arrangement of claim 15 in which said means for deriving said electrical control signals comprises a correllator for producing an auto-correlation of said electrical mixed signals.

19. The telemetering arrangement of claim 15 in which said means for deriving said electrical control signals comprises a phase locked loop.

20. The telemetering arrangement of claim 1 in which at least some of said pressure changes are generated by said pump means and said means for producing electrical control signals is attached to said pump means.

21. The telemetering arrangement of claim 1 in which at least some of said pressure changes are generated by said pump means and said means for producing electrical control signals is coupled to said pump means.

22. The telemetering arrangement of claim 20 in which said means for producing electrical control signals is an electric pulse generator attached to said pump means.

23. The telemetering arrangement of claim 21 in which said means for producing electrical control signals is an electric pulse generator coupled to said pump means.

24. The telemetering arrangement of claims 22 or 23 in which said pump means pumps drilling fluid by means of a sequence of strokes actuated by revolutions of said pump means and said pulse generator generates a plurality of pulses during the time interval corresponding to a single revolution of said pump means.

25. The telemetering arrangmenet of claims 20, 21, 22 or 23 wherein said pump means pumps drilling fluid by means of a sequence of strokes of reciprocating pistons actuated by a rotating member of said pump means and wherein said electrical control signals are generated responsively to successive angular positions of said rotating member within each of said strokes.

26. The telemetering arrangement of claim 10 in which said means for producing said electrical control signals includes means for deriving said electrical control signals from said electrical mixed signals.

27. The telemetering apparatus of claim 26 in which said means for deriving said electrical control signals comrprises means for averaging said electrical mixed signals to produce electrical control signals in which said distinguishable characteristic is salient.

28. The telemetering arrangement of claim 26 in which said means for deriving said electrical control signals comprises a correllator for producing an autocorrelation of said electrical mixed signals.

29. The telemetering arrangement of claim 26 in which said means for deriving said electrical control signals comprises a phase locked loop.

* * * * *

UNITED STATES PATENT AND TRADEMARK OFFICE
CERTIFICATE OF CORRECTION

PATENT NO. : 4,692,911

DATED : Sep. 8, 1987

INVENTOR(S) : Scherbatskoy

It is certified that error appears in the above-identified patent and that said Letters Patent is hereby corrected as shown below:

Column 13, line 20 change " $\phi_{ff}(\tau) = [S(t) + N(t)] [S(t+\tau) + N(t+\tau)]$ "

to -- $\phi_{ff}(\tau) = \overline{[S(t) + N(t)] [S(t+\tau) + N(t+\tau)]}$ --

Column 13, line 29, change " $\phi_{ss}(\tau) = S(t)S(t+\tau)$ "

to -- $\phi_{ss}(\tau) = \overline{S(t)S(t+\tau)}$ --

Column 13, line 33, change " $\phi_{nn}(\tau) = N(t)N(t+\tau)$ "

to -- $\phi_{nn}(\tau) = \overline{N(t)N(t+\tau)}$ --

Signed and Sealed this

Seventh Day of January, 1992

Attest:

HARRY F. MANBECK, JR.

*Attesting Officer*  *Commissioner of Patents and Trademarks*